US005537770A

United States Patent [19]

Storm et al.

[11] Patent Number: 5,537,770
[45] Date of Patent: Jul. 23, 1996

[54] METHOD AND APPARATUS FOR ALTERING FISHING LURES

[75] Inventors: John M. Storm; William D. Storm, both of Norman; James L. Morton, Edmond, all of Okla.

[73] Assignee: Storm Plastics, Inc., Norman, Okla.

[21] Appl. No.: 299,157

[22] Filed: Aug. 31, 1994

[51] Int. Cl.$^6$ .......................... A01K 85/16; A01K 85/00
[52] U.S. Cl. ...................... 43/42.22; 43/42.39; 43/42.53
[58] Field of Search ................................ 43/42.39, 42.5, 43/42.53, 42.47, 42.22, 42.32

[56] References Cited

U.S. PATENT DOCUMENTS

| | | | |
|---|---|---|---|
| 723,045 | 11/1902 | Shaffer | 43/42.39 |
| 800,536 | 10/1904 | Bailey et al. | 43/42.39 |
| 2,274,596 | 2/1942 | Fink | 43/42.39 |
| 2,483,245 | 9/1949 | Steinhart | 43/42.39 |
| 2,502,562 | 4/1950 | Fike | 43/42.47 |
| 3,955,304 | 5/1976 | Reid | 43/42.39 |
| 3,979,853 | 9/1976 | Storm et al. | 43/42.39 |
| 4,098,017 | 7/1978 | Hall | 43/42.39 |
| 4,287,679 | 9/1981 | Klotz | 43/42.39 |
| 4,771,567 | 9/1988 | Cannon | 43/42.39 |
| 5,119,581 | 6/1992 | Rudolph | 43/42.39 |

Primary Examiner—Joseph J. Hail, III
Assistant Examiner—Jay A. Stelacone
Attorney, Agent, or Firm—Dougherty, Hessin, Beavers & Gilbert

[57] ABSTRACT

A method and apparatus for altering or modifying fishing lures to vary the normal action of the fishing lure during retrieval and to achieve a desired modified action. The apparatus includes a kit of substantially identically sized and uniformly shaped weights. The method consists of affixing any number of the weights to the body lure at any location to achieve the desired modified action, which may include suspending the lure, changing the rate of vertical displacement of the lure or causing the lure to swim or track to the left or right of the fisherman.

28 Claims, 1 Drawing Sheet

5,537,770

METHOD AND APPARATUS FOR ALTERING FISHING LURES

BACKGROUND OF THE INVENTION

The present invention relates generally to weights for use in connection with fishing lures, and more particularly, but not by way of limitation, to improved methods and apparatus for altering the weight, buoyant properties, movement or action through the water and configuration of fishing lures.

Fish are known to respond differently to the presentation of a lure with changes in water temperature, season of the year, water clarity, and numerous other variations in the local environment, and will sometimes respond to a lure only when it remains in its immediate proximity for an extended period of time.

Therefore, the fishing industry has, for years, experimented with ways to alter or change the normal action of a fishing lure as it is retrieved through a body of water. Typically, after a buoyant lure is cast into the water, it will initially float to and rest on the surface of the water. When the lure is retrieved, it will dive to various depths depending upon the lure configuration, and will swim or track directly toward the fisherman. When the fishermen pauses, the lure will ascend and return to the surface. It is desirable, at times, to vary that normal action of the fishing lure.

For instance, a fisherman may want a lure to track to the left or right as it is being retrieved. Further, in certain conditions and at certain times, it is desirable to slow the normal rate at which the lure ascends to the surface. It is desirable in some conditions to alter a lure so that it will suspend at a desired depth when the fisherman pauses during retrieval, or to cause a lure which normally rises to the surface of the water to descend when the lure is at rest in the water. In other words, fishermen very often wish to alter the normal rate of vertical displacement of the lure.

There are methods for modifying lures and for altering the lures so that such lures will suspend. However, as described below, each method is imprecise, difficult to duplicate and is time consuming and difficult to perform at the fishing site.

One method for altering the vertical rate displacement of a fishing lure or to attempt to suspend the fishing lure comprises drilling a hole in the lure and filling the lure with mercury, rattles, water, BB's, lead shot or other weights. The hole is then sealed. Once the operation is complete, if a readjustment is desired, a hole must again be drilled into the lure so that weights can be removed or added. Such a method is time consuming, imprecise and difficult, if not impossible, to achieve at the fishing site.

Other prior art lures have a predrilled hole and a removable plug which allows for the addition of water or other material. Again, such a method is imprecise and is difficult to duplicate. Even if the amount of water added to the lure is known, it is impossible to duplicate on other lures unless each of the other lures also have predrilled holes and plugs.

Other methods for altering lures include inserting lead rods or wire in a lure, or wrapping lead wire or solder around the shank of a hook which is attached to the lure. The weight of such lures can be altered by cutting or shaving the metal away from the lure. Obviously in the case of inserted lead rods, weight can only be adjusted down. Further, it is difficult to determine the amount of weight removed so that once the desired buoyancy is achieved it can be duplicated with other lures.

Finally, it is known that sticking adhesive-backed metal tape to a lure will increase the weight of the lure. However, such a method suffers from the same deficiency as other methods. To achieve the desired action, one must add and/or remove approximate odd shaped lengths of tape. Even though one may ultimately achieve the desired result or action, it is extremely difficult to duplicate with other lures. Further, such a process will result in a lure that is no longer aesthetically pleasing.

Accordingly, it is an object of this invention to provide a new and improved method and apparatus for duplicably modifying fishing lures to vary the normal action thereof. It is another object to provide a method for modifying a lure that is easy to perform and that can be performed in a short period of time at the fishing site. It is another object of this invention to provide a method for modifying or altering a fishing lure that results in an aesthetically pleasing lure.

SUMMARY OF THE INVENTION

The present invention is directed to improved methods and apparatus for altering or modifying fishing lures to vary the normal action of the fishing lure. The method provides for a simplified way of modifying lures which can be easily duplicated and which can be performed at the fishing site. The apparatus comprises a kit with a plurality of substantially uniformly shaped and sized weights which can be affixed directly to the body of the fishing lure. The weights may be comprised of a formable or flexible metal tape, such as, but not limited to lead tape, copper tape or tin tape with an adhesive backing, and can be applied directly to the body of a lure. The weight may be of any shape, such as a circle, square, rectangle, triangle, star or any other shape. Alternatively, the weight can be comprised of a snap which can be snapped into a snap receptacle attached to a fishing lure, and may include other means of attachment for temporarily adding the weight to the lure.

The method of the present invention includes forming the substantially identically sized and uniformly shaped weights from a selected material, which may include but is not limited to the aforementioned adhesive-backed metal tape. The method includes affixing to the fishing lure the number of weights required to achieve a desired modified action. The number and location of weights attached to the lure are then recorded so that the action can be duplicated with other similar fishing lures.

The method may further include casting the lure into a body of water, retrieving the lure, observing the action of the lure and adding or removing any number of uniformly shaped weights to the body of the lure at any location to alter the action of the lure until the desired modified action is achieved. The total number of weights affixed to the lure at that time and the location of the weights is then recorded.

The method may also include determining the number of weights required to alter the buoyancy of the lure so that the lure will suspend, and affixing that number of weights to the body of the lure. The number of weights affixed to the body is then recorded so that other similar lures can be altered to suspend at the same depth. The method essentially includes affixing the number of weights required to achieve any desired modified action, including the aforementioned actions and also including other actions such as, but not limited to, tracking to the left or right, suspending at an angle from the horizontal, slowing the rate of ascent to the surface and sinking at a desired rate toward the bottom.

Numerous objects, features and advantages of the present invention will be readily apparent to those skilled in the art upon a reading of the following disclosure when taken in conjunction with the accompanying drawings.

DETAILED DESCRIPTION OF THE PREFERRED EMBODIMENTS

Figure 1:
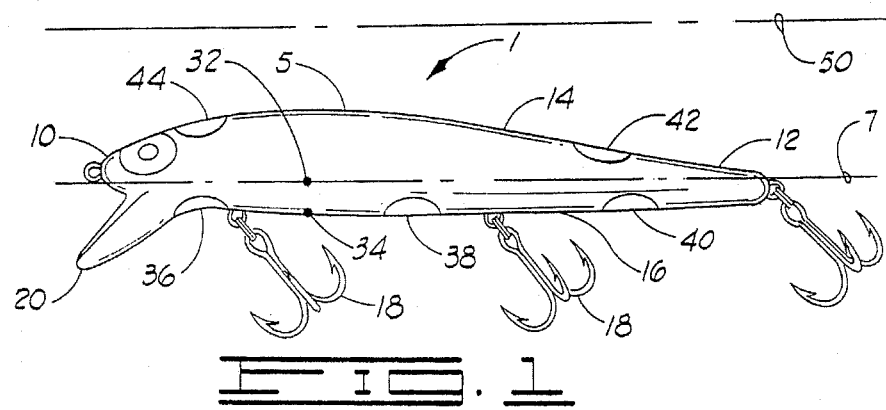
FIG. 1 is a side elevational view of a fishing lure of the present invention.
Figure 2:
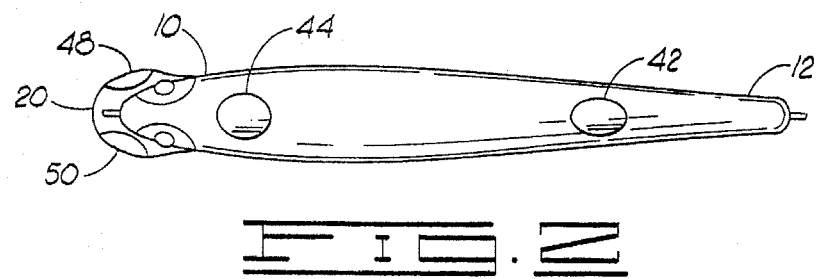
FIG. 2 is a top elevational view of a fishing lure of the present invention.
Figure 3:
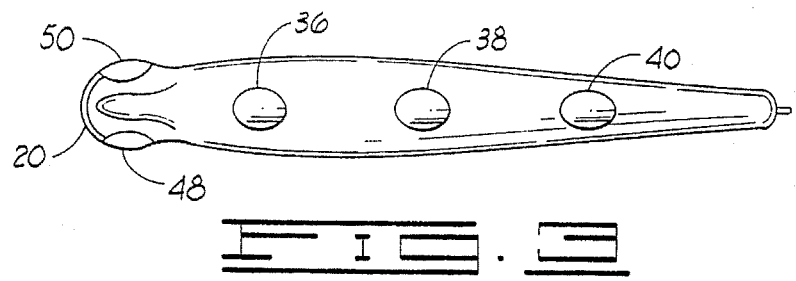
FIG. 3 is a bottom elevational view of a fishing lure of the present invention, without the hooks attached.

A fishing lure on which the method of the present invention may be practiced is shown in FIG. 1 and generally designated as the numeral 1. The method and apparatus described herein may be used with any type of fishing lure and is not limited in any way by the schematic of the lures shown in the accompanying Figures. The fishing lure 1 generally includes a body 5, having a forward end 10, a rear end 12, and a longitudinal central axis 7. Fishing lure 1 also includes an upper or top side 14 and a lower or under side 16. One or more hooks 18 are attached to the lure. The lure also includes a lip or bill 20 at or near forward end 10 of the lure.

Figures 5, 6:
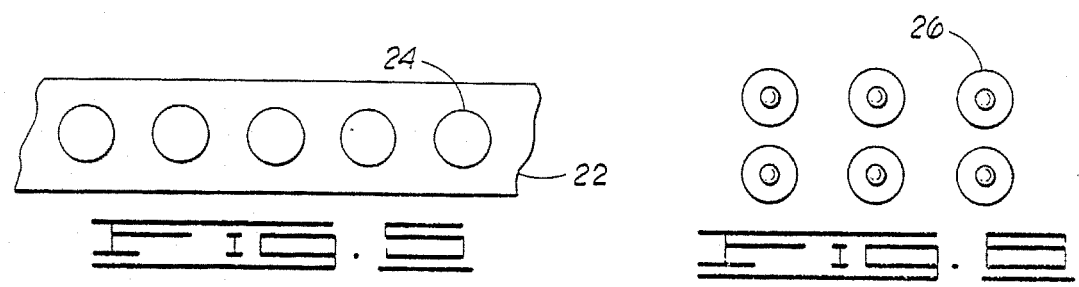
FIG. 5 is a view of a kit or strip of fishing weights of the present invention.
FIG. 6 is a view of an alternative embodiment of a kit of weights of the present invention.

FIG. 5 shows an apparatus or kit 22 for modifying or altering a fishing lure so that the normal action of the lure is modified to achieve any desired action. The kit may generally include a strip of material having a plurality of uniformly shaped and substantially identically sized weights 24 cut therefrom. The material may be die cut to provide uniform shape and sizes. The embodiment of FIG. 5 shows the weights as being circular in shape. However, the weights may be any shape, such as squares, circles, rectangles, triangles, stars or any other uniform shape. The weight of the fishing weights 24 is known, and may vary from, but is not in any way limited to, 0.05 grams to 0.50 grams.

Figure 4:
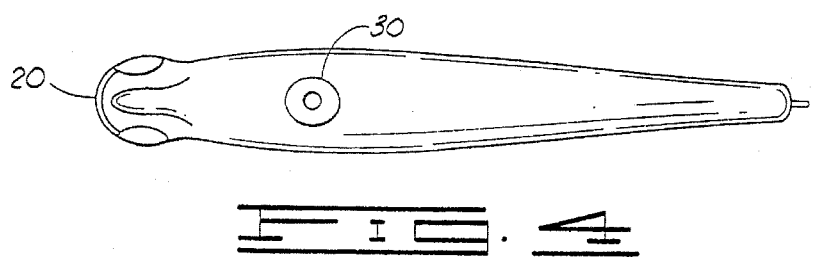
FIG. 4 is a bottom elevational view of an alternative embodiment of a fishing lure of the present invention, without the hooks attached.

In the preferred embodiment, the material comprises a flexible metal tape having an adhesive back, and more preferably comprises relatively thin, flexible lead tape. To perform the method of the present invention, one or more weights 24 are removed from the kit 22 and are affixed to the body of lure 1 by sticking the weights onto the body of said lure at any desired location, so that weights 24 mold or conform to the shape of lure body 5. The kit 22 may alternatively include a plurality of snaps 26, shown in FIG. 6, which may be snapped to a lure having a snap receptacle 30 as shown in FIG. 4. The kit may further include substantially identically sized and uniformly shaped weights cut from any flexible material which can then be molded or formed to the shape of lure body 5 and then glued or affixed in any way.

Typically, a floating or buoyant lure as shown in FIG. 1 will be cast into a body of water, and prior to the time the fishermen begins to retrieve the lure, it will float on the surface of the water. Once the fishermen begins to retrieve the lure, bill 20 causes the lure to dive so that as the lure is retrieved it swims or tracks below the surface of the water. The lure typically tracks directly toward the fisherman, and generally will wiggle or vibrate as it is being retrieved. It is often desirable to modify the normal action of the lure, depending on various considerations including but not limited to, water temperature, the existence of debris and other structure in the water, the time of the year, location of fish, aggression of fish and water salinity.

It may be desirable to have the lure track to the left or to the right of the fisherman as it is being retrieved. Other desirable actions include suspending the lure at a desired depth as the lure is paused during retrieval. It is also desirable to slow the rate at which the lure normally ascends to the surface when the fisherman pauses the retrieving motion, or to cause the lure to descend. It is also desirable to be able to add weight to a lure to increase its casting distance, without permanently altering the lure itself. The method of the present invention is an improved method for modifying fishing lures to vary the normal action of the lure and to achieve any desired modified action, and to improve the castability of the lure.

The method may be carried out by providing a plurality of substantially identically sized and uniformly shaped weights 24 and affixing one or more of said weights directly to the body 5 of the fishing lure to vary the normal action of the lure and to achieve the desired modified action. Weights 24 may be placed at any location on the body or the bill of the lure, and may be stacked one on top of the other until the desired modified action is achieved. Because the weights can be stacked, weight can be added to a lure at a desired and concentrated location without interfering with the hook. Once the desired action is achieved, the number and location of the weights can be recorded so that other lures can be modified to achieve the same modified action simply by affixing the same number of uniform shapes to the other lures. Slight variations in the construction of individual lures of the same shape and size may require slight further modification due to manufacturing variables. However, the present method establishes a repeatable basis from which to adjust for these minor manufacturing variables. The lure can be altered to return to its normal action simply by removing the weights from the lure body.

The method may further include casting the lure after initially affixing weights to the lure body, retrieving the lure and observing the action of the lure as it is retrieved and adding or removing weights to the body of the lure. Such steps may be repeated until the desired modified action is achieved. Again, the total number of weights is then recorded so that the action may be duplicated with other similar lures.

Thus, the improved method provides for altering or modifying fishing lures to achieve any desired action. For instance, the method may include determining the number of weights required to alter the lure so that the lure will suspend at a desired depth, and affixing that number of weights to the body of the lure. The method can also include dropping the lure into a body of water after a number of weights have been attached thereto, observing the rate at which the lure rises or sinks, and then incrementally adding or removing the weight in multiples of the uniform shape(s) being utilized to increase or decrease the rate at which the lure rises or sinks, even to the point at which the lure neither rises nor sinks, but simply suspends. Such steps can be repeated until the lure suspends at the desired depth or until the lure rises or sinks at the desired rate. The method may include positioning weights 24 at locations 36 & 38 as shown in FIG. 1 so that a center of gravity 32 of the lure 1 is vertically coaxial with a center of gravity 34 of the weights 24. Thus, the method includes positioning the weights so that the lure suspends substantially horizontally at a desired depth.

The method may also include positioning weights at locations 40 and/or 42 at or near the rear end 12, so that the lure will suspend or rest at an angle from a line parallel to a horizontal line 50 with the forward end 10 of the lure above the rear end 12. Likewise, weights can be located at locations 36 and/or 44 so that the lure suspends at an angle from a line parallel to horizontal line 50 with the forward end 10 below the rear end 12. Thus, the method includes positioning weights so that the lure will rest or suspend such that the longitudinal central axis of the lure is at any desired angle from a line parallel to horizontal line 50.

Weights can also be placed on the left or right hand side of the bill at locations 48 and 50 respectively or the lower left or lower right hand side of the body so the lure will track to the left or right as it is retrieved. The right hand side of the lure is the right side of the lure from the fisherman's perspective as the lure is being retrieved.

As can be seen, the method of the instant invention provides for a relatively precise and simple method of modifying or altering a fishing lure to achieve any desired action. The examples provided herein do not limit in any way the number or location of weights that can be placed on the lure. Weights can be placed anywhere on the lure, and at any combination of locations until the desired modified action is achieved. The action can be duplicated, or very nearly duplicated, simply by recording the location and number of weights placed on the lure body and by placing an equivalent or similar number of weights on other similar lures. The method can be performed at the fishing site and can be performed in a short period of time. The lure can be returned to its original condition simply by removing the added weights.

Thus, it is seen that the method and kit of the present invention readily achieves the ends and advantages mentioned as well as those inherent therein. While certain preferred embodiments of the invention have been illustrated and described for purposes of the present disclosure, numerous changes in the arrangement and construction of parts may be made by those skilled in the art, which changes are encompassed within the scope and spirit of the present invention as defined by the appended claims.

What is claimed is:

1. A kit for altering a fishing lure to modify the action thereof comprising:

a plurality of substantially uniformly shaped and sized weights; and means for attaching said weights directly to a body of said lure thereby modifying the action of said lure, said weights being flexible and conformable to the shape of said body so that said weights may be used on and will conform to the body shape of different lures.

2. The kit of claim 1 wherein said weights are comprised of pieces of formable, metal tape, and wherein said means for attaching comprises an adhesive backing applied to said metal tape, so that said metal tape will adhere directly to said lure body.

3. The kit of claim 2 wherein said metal tape comprises lead tape.

4. The kit of claim 2 wherein said pieces of metal tape are flat pieces of a specified geometric shape, each having a known weight.

5. The kit of claim 2 wherein said pieces of metal tape are flat, circular pieces each having a known weight.

6. A method of duplicably modifying a fishing lure comprising:

(a) providing a plurality of substantially identically sized and uniformly shaped weights; and (b) affixing any number of said weights directly to a body of said fishing lure, said weights being conformable to an exterior shape of said body so that said weights may be affixed to different lures whereby the action of said lure during retrieval is modified to achieve a desired modified action.

7. The method of claim 6 further comprising:

(c) recording the number and approximate location of said weights affixed to said body, so that said modified action can be duplicated with other similar fishing lures by affixing the same or substantially the same number of weights thereto.

8. The method of claim 6, further comprising:

(c) casting said lure into a body of water;

(d) retrieving said lure;

(e) observing the action of said lure as it is retrieved;

(f) adding or removing any number of said uniformly shaped weights to the body of said lure to alter the action thereof; and (g) repeating steps (c)–(f) until said desired modified action is achieved.

9. The method of claim 8, further comprising:

(h) recording the number and approximate location of said weights affixed to said lure so that said modified action can be duplicated with other identical or similar fishing lures by affixing the same number of uniformly shaped weights thereto.

10. The method of claim 6, wherein said providing step comprises cutting said weights from a strip of adhesive backed metal tape.

11. The method of claim 6, wherein said fishing lure is a buoyant lure, and wherein said affixing step comprises affixing the number of weights required to decrease the rate at which said lure ascends to the surface of a body of water to a desired rate of ascent.

12. A method of duplicably altering the buoyancy of a fishing lure comprising:

(a) forming substantially identically sized and uniformly shaped weights, said weights being flexible and conformable to the shape of a body of said fishing lure and having an adhesive backing; and (b) affixing a number of said weights to said body of said lure with said adhesive to alter the buoyancy thereof.

13. The method of claim 12, further comprising:

(c) determining the number of said weights required to alter the buoyancy of said fishing lure so that said lure will suspend at a desired depth; and (d) affixing said number of said weights to said body of said lure, so that said lure suspends at said desired depth.

14. The method of claim 13, further comprising:

(e) recording the number of said weights affixed to said lure, so that other similar lures can be altered to suspend at said desired depth by affixing the same number of said weights to said other lures.

15. The method of claim 13 wherein said determining step comprises:

(c)(1) attaching a number of said weights to said lure;

(c)(2) dropping said lure into a body of water;

(c)(3) observing the rate at which said lure rises or descends;

(c)(4) incrementally adding or removing said weights from said lure to change the weight thereof; and (c)(5) repeating steps (c)(2)–(c)(4) until said lure suspends at said desired depth without rising or descending.

16. The method of claim 15 further comprising:

(e) recording the total number of weights affixed to said body, so that other fishing lures can be altered to suspend at said desired depth.

17. The method of claim 13 further comprising:

(e) positioning said weights on said lure so that the center of gravity of said weights and a center of gravity of said lure are substantially vertically coaxial.

18. The method of claim 13 further comprising:

(e) positioning said weights on said lure so that said lure suspends substantially horizontally.

19. The method of claim 13 further comprising:

(e) positioning said weights on said lure so that said lure suspends such that a longitudinal central axis of said lure is disposed at a desired angle from a horizontal line.

20. The method of claim 12, wherein said forming step comprises:

(c) cutting said substantially identically sized and uniformly shaped weights from a thin flexible metal tape.

21. The method of claim 20, wherein said affixing step comprises:

(b)(1) sticking said weights to said body; and (b)(2) conforming said weights to the shape of said body.

22. The method of claim 12 further comprising:

(c) dropping said lure into a body of water;

(d) observing the rate at which said lure rises or descends;

(e) incrementally adding or removing said weights from said lure to change the weight thereof; and (f) repeating steps (c)–(e) until said lure rises or descends at a desired rate.

23. The method of claim 22 further comprising:

(g) recording the total number of said weights attached to said body, so that other similar fishing lures can be altered to rise or descend at said desired rate.

24. A kit for altering the buoyancy of a fishing lure comprising:

a plurality of weights, each of said weights having a known weight; and means for attaching said weights to said lure, said weights being flexible so that said weights will conform to an exterior shape of body of said lure at various locations on said body.

25. The kit of claim 24 wherein each of said plurality of weights is substantially uniformly shaped.

26. The kit of claim 25 wherein each of said plurality of shapes is substantially uniformly sized.

27. The kit of claim 24 wherein said weights are comprised of conformable metal tape having an adhesive back.

28. The kit of claim 24 wherein said means for attaching comprises an adhesive on said weight.

* * * * *